June 22, 1943.  T. RUBENS  2,322,256
TILLAGE IMPLEMENT
Filed Oct. 12, 1939   3 Sheets-Sheet 1

TIMOTHY RUBENS
INVENTOR

BY O.W. Lee
ATTORNEY

June 22, 1943. T. RUBENS 2,322,256
TILLAGE IMPLEMENT
Filed Oct. 12, 1939 3 Sheets-Sheet 2
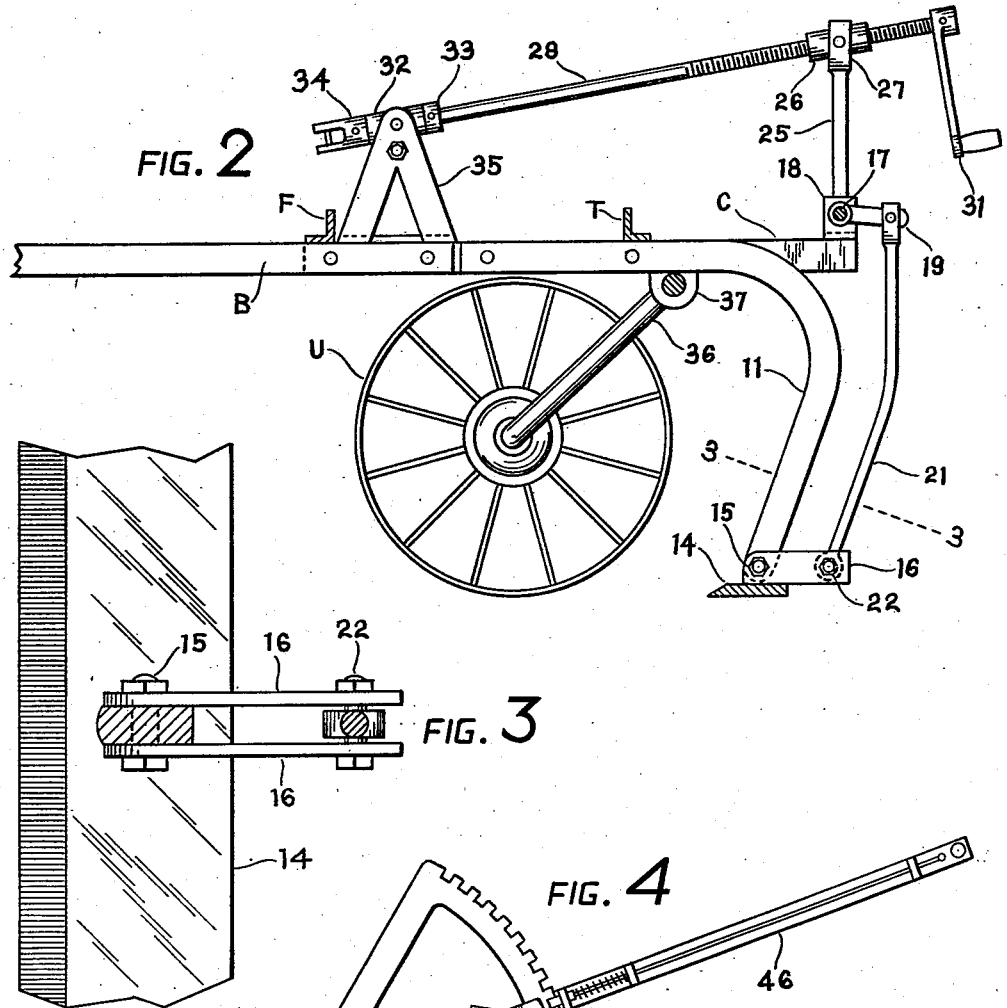
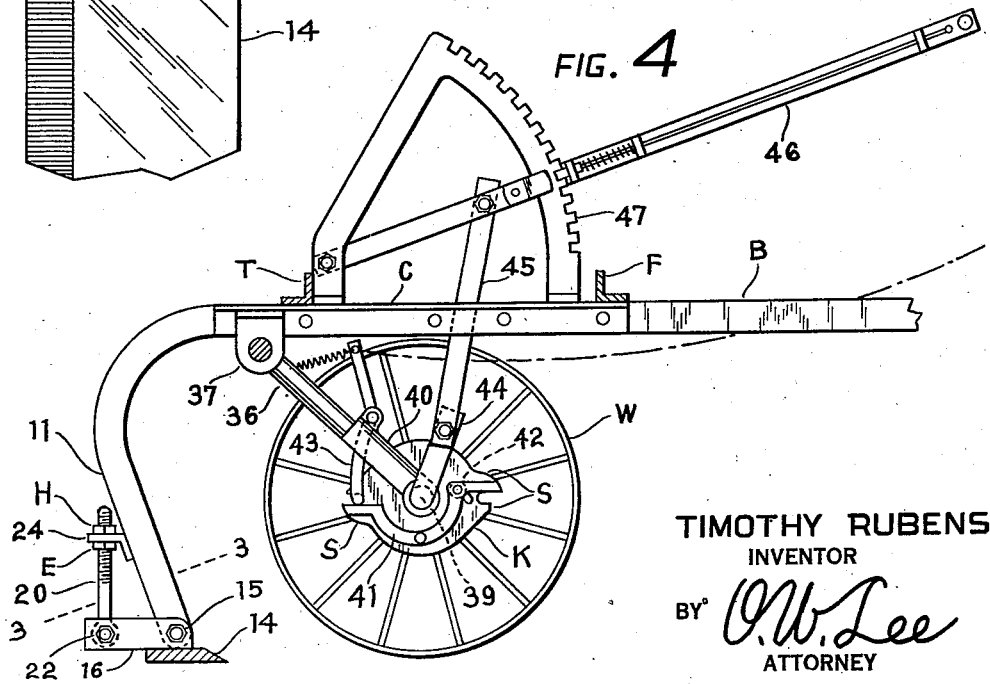
TIMOTHY RUBENS
INVENTOR
BY *O. W. Lee*
ATTORNEY June 22, 1943.  T. RUBENS  2,322,256
TILLAGE IMPLEMENT
Filed Oct. 12, 1939  3 Sheets-Sheet 3
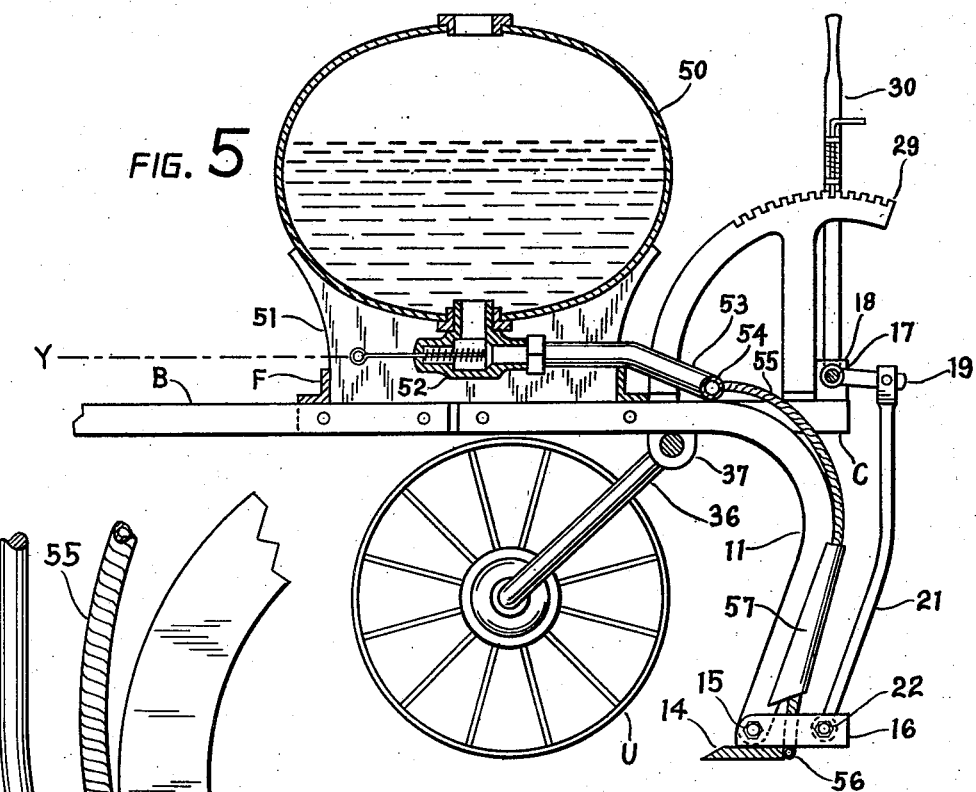
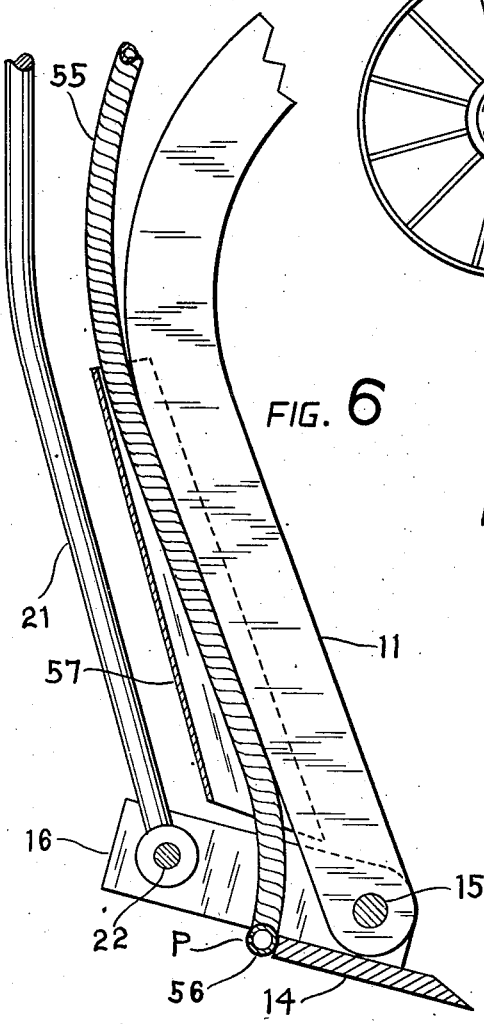
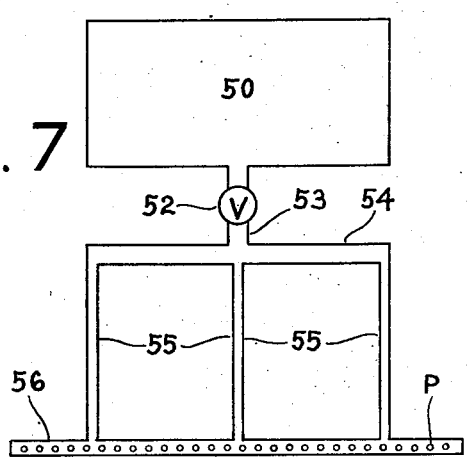
TIMOTHY RUBENS
INVENTOR
BY O.W.Lee
ATTORNEY Patented June 22, 1943

2,322,256

UNITED STATES PATENT OFFICE 2,322,256

TILLAGE IMPLEMENT

Timothy Rubens, Farmington, Wash., assignor to Cheney Weeder Company, Cheney, Wash., a a corporation of Washington Application October 12, 1939, Serial No. 299,045

11 Claims. (Cl. 97—144.1)

The present invention relates to certain new and useful improvements in a tillage implement of the straight blade type and includes improvements which make it possible to successfully operate the blade at various depths in hard soil, without requiring excessive draft power.

Utilizing a straight blade for deep tillage, presents various problems which are at variance with what might be expected, and the present invention solves those problems so as to utilize a straight blade under conditions which would otherwise render it unsuitable.

Extensive experiments and experience has conclusively proven that in hard soil, successful operation at various depths is impossible with a fixed blade, no matter at what inclination it may be set. The pitch of the blade is far more critical than would be expected. At a depth of fourteen inches, a pitch of half an inch on a blade six inches wide and six feet long will completely stall a tractor which will readily pull the same blade at that depth when that half inch pitch is not present. With that half inch pitch, a more powerful tractor will immediately break an implement to pieces, when that implement would otherwise be sufficiently strong when that half inch pitch is not present.

At any depth of more than eight inches in hard soil, the blade must run approximately parallel with the line of cut, or else there will be an extreme stress on the implement and an excessive draft power required, which needlessly wastes tractor fuel and greatly adds to the cost of operation.

At depths of less than eight inches in hard soil, the pitch must be increased according to the type of soil and the character of the roots of tares which are encountered. Large tares with woody roots will cause the blade to rise to the surface, and necessitate changing the pitch of the blade. Changing the pitch as little as an eighth of an inch will convert an inoperative blade to successful operation.

A blade that is operating successfully at a depth of six inches in hard soil, will not operate successfully in the same soil, when raised to a depth of three inches, unless the pitch of the blade is properly altered.

Strangely enough, a blade that will penetrate hard soil to a depth of ten inches or more, will not even stay in the ground when raised to a depth of three inches, unless the pitch of the blade is properly altered; mere raising and lowering of the frame is not sufficient. Raising the blade from a depth of fourteen inches to a depth of ten inches, without altering the inclination of the blade, will unnecessarily waste considerable draft power.

In loosely packed soil, the blade must have considerable pitch, otherwise it will not operate successfully, and this is true at all depths. The looseness of the soil and the underground character of the vegetation, determines the required pitch of the blade. Depth is a very minor factor in loosely packed soil; but in hard soil, depth is the principal factor.

The present invention provides a straight blade tillage implement which will operate successfully in hard soil at various depths from two to fourteen inches or more. Large tares with woody roots can be cut through at various depths in the manner required to gradually exterminate them. For tillage purposes, the implement can be used at greater depth than is practical to plow, and it leaves the soil in coarsely broken condition in the original position, instead of turning it in the manner of a plow. Thus, the implement is of particular advantage in shallow top soils where deep tillage is necessary to provide water storage for the dry season, and where deep plowing would objectionably bring up the non-productive subsoil. With my invention, the blade can be held at the proper inclination to operate at a given depth with less draft power than is required for gang plows cutting the same width and depth.

Where repeated plowing at uniform depth has formed a plow-pan, the implement of my invention can be operated below that depth, to break up the plow-pan and thereby produce a greater water storage capacity of the soil.

In contradistinction to subsoiler implements which scarp the ground at spaced distances, the present invention cuts a smooth even floor and coarsely breaks up the soil throughout the entire path of the blade.

The accompanying drawings disclose practical embodiments of my invention.

Fig. 2 is a vertical section taken on the line 2—2 of Fig. 1.

Fig. 3 is an enlarged sectional detail as indicated by the line 3—3 in both Fig. 2 and Fig. 4.

Fig. 4 is a vertical section taken on the line 4—4 of Fig. 1 but showing a simplified form of blade rocking device.

Fig. 5 is a vertical section showing a modification of Fig. 2 and also including a tank and pipe lines for depositing liquid chemicals at the rear of the blade.

Fig. 6 is an enlarged sectional detail taken from Fig. 5.

Fig. 7 is a diagram of the tank and pipe lines.

Figure 1:
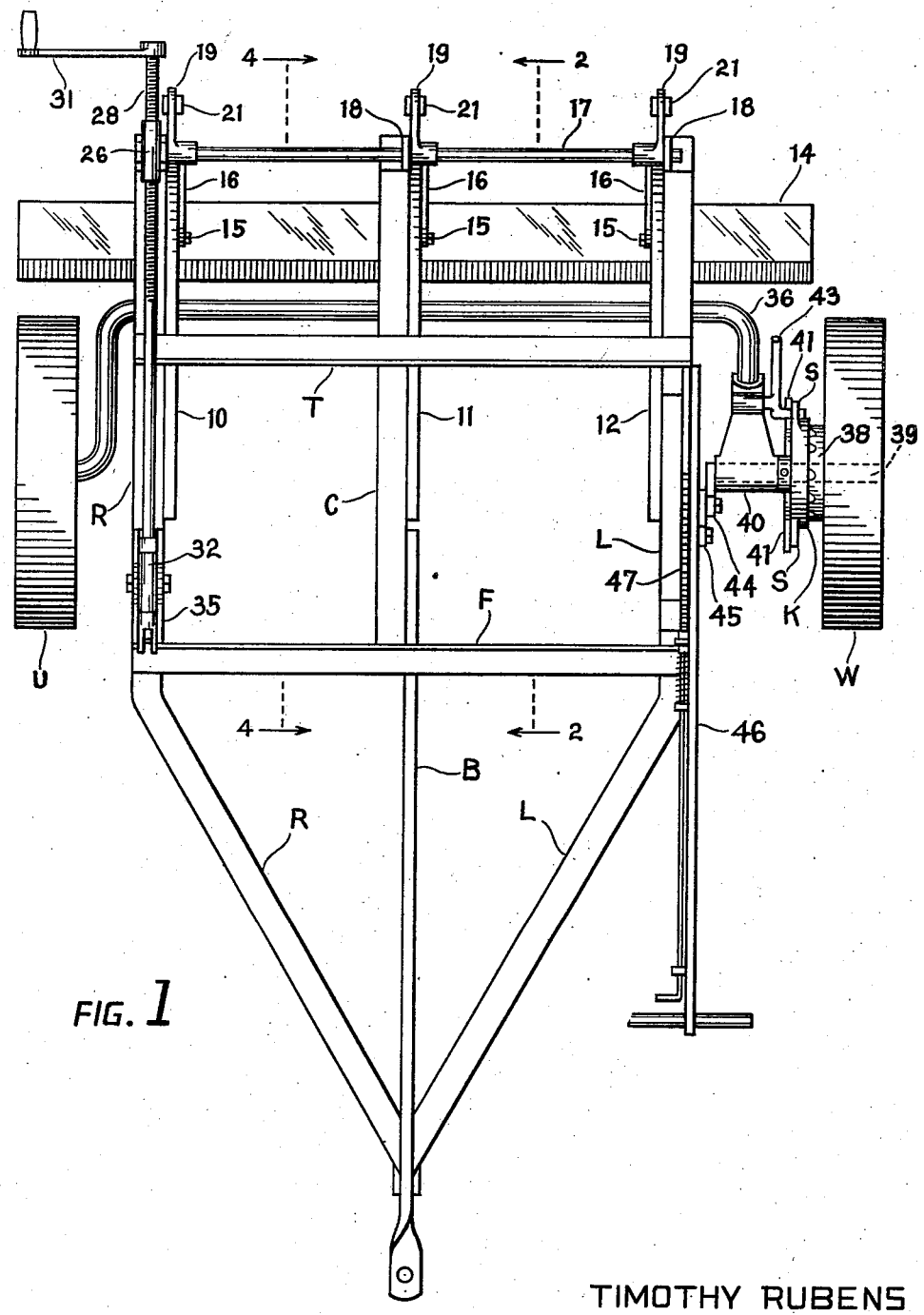
Fig. 1 is a plan view of my improved tillage implement in the preferred form which is now being commercially marketed.

In carrying out my invention, the implement frame may be of any suitable construction. Fig. 1 shows side rails L and R which converge forwardly and are joined to a center bar B which is also joined to a center rail C. These three rails are held in spaced relation by a front cross-bar F and rear cross-bar T. Downwardly extending standards such as 10, 11 and 12 are rigidly secured to these rails R, C and L respectively. If desired, these standards may have their forward ends increased in length to equal the full length of the frame and similarly bent so as to thus eliminate the need for the described rails, the described cross-bars being then attached to the standards for the purpose of holding the latter in spaced relation with each other.

A blade 14 is hinged to each of these standards, as for instance, by a bolt 15 which passes through the lower end of the standard and through paired lifting arms 16 which are rigidly secured to the blade, preferably by welding. The paired lifting arms are of advantage for strength and stability.

With the blade 14 thus hinged to each of the standards, its inclination can be altered to meet the exacting requirements of successful operation.

As shown in Fig. 1 and Fig. 2 a rock shaft 17 is journaled in suitable bearings such as 18 mounted upon the rear portion of the frame. Rocker arms 19 are rigid with this rock shaft, and links 21 pivotally connect the respective rocker arms with the corresponding rear ends of the paired lifting arms 16 as indicated at 22.

The rock shaft 17 may be operated in any practical manner which will provide positive and accurate movement of the blade 14. Fig. 2 shows a lever 25 which is fixed to the rock shaft 17, and a threaded bearing 26 is pivoted in the upper free end of this lever which is here shown with a yoke 27 for that purpose. A screw rod 28 is threaded into the bearing 26 and this rod extends forwardly where it is journaled in a bearing 32 which is pivoted in a bracket 35 rigid with the frame. Suitable collars 33 and 34 hold the rod 28 against longitudinal movement in the bearing 32. It will be seen that turning of this screw rod will move the lever 25 of the rock shaft 17 and consequently impart a hinge movement to the blade 14 to alter its inclination relative to the supporting standards. The arcuate movement of the lever is accommodated by the two pivoted bearings 26 and 32. This screw rod 28 may be manually turned in any suitable manner, a crank handle 31 being shown for that purpose, and also the collar 34 is shown with a forked end to receive a universal joint for a tumbler shaft extending forwardly to a suitable position so as to be operated from the driver's seat of a tractor, in which case the lever 25 and its actuating parts are usually positioned centrally of the frame. The lever ratio is such that the screw thread will readily hold the lever at set inclination without the need of any locking device.

Fig. 5 shows the rock shaft 17 provided with a latch lever 30 which engages a toothed sector 29, and it will be readily understood that this lever can be employed to impart a hinge movement to the blade 14 and to hold it at set inclination relative to the supporting standards.

Fig. 4 shows a simplified means for imparting the required hinge movement to the blade 14. As here shown, an eye-bolt 20 is pivotally connected at 22 to the paired lifting arms 16 and passes through a bracket lug 24 fixed to the previously described standard. Upper and lower nuts H and E provide the necessary take-up and hold the blade at whatever hinged inclination may be required for satisfactory operation as before explained. Of course, each standard is provided with an eye-bolt and bracket.

As thus far described the device is operatable for deep tillage without the necessity of any carriage wheels, but it is advisable to provide some form of vertically movable wheels, for convenience in transporting the device. When used for the sole purpose of combating large tares which occur in numerous patches widely scattered over a large field, it is advisable to provide a lifting wheel mechanism such as shown in Fig. 1 and Fig. 4. A crank axle 36 is mounted in bearings such as 37, and a wheel U turns on one end of this crank axle, and at the opposite end is a lifting wheel W which is connected to the frame of the machine through the medium of a clutch which turns a radius arm which is connected to the frame by a link, so that movement of the radius arm alters the position of the frame in relation to the wheels. Various forms of lifting wheel devices are in general use and I have shown by way of example one of the well known forms.

As here shown, the lifting wheel W has an internally notched hub 38 which is journaled on a crank pin 39 which is journaled in a bearing head 40 which is attached to one arm of the crank axle 36. A radius arm 44 is rigid with the crank pin 39 to which a clutch housing K is keyed and fitted over the internally notched hub 38. Fulcrumed on this housing is a clutch lever 41 which has a stud which passes through a slot in the housing and carries a roller 42 for engaging the internally notched hub 38. The housing K is provided with two pairs of lugs S as illustrated, and the bearing head 40 carries a spring urged trip lever 43. The roller 42 is normally held disengaged by the spring urged trip lever 43 contacting one end or the other of the clutch lever 41 and at the same time engaging between the paired lugs S to hold the radius arm 44 at its rotated position either up or down as the case may alternately be. A link 45 pivotally connects this radius arm with a lever 46 upon a toothed sector 47 which is rigid with the main frame. Thus the wheel W turns free until the trip lever 43 is manually disengaged, whereupon the clutch engages and the wheel imparts its movement to the clutch housing and the parts carried thereby while this trip lever rides on the face of the clutch housing until it drops between the paired lugs S and thus disengages the clutch and holds the housing and related parts against further movement while the wheel again turns free. The amount of lift is of course determined by the length of the radius arm 44, and the range of movement is altered by setting the lever 46 according to the depth at which the blade 14 is to be operated.

There is a direct cooperative relationship between this lifting device and the blade 14 and its angling device hereinbefore described. In the operation of the implement, the wheels are set for the desired depth, and if the inclination of the blade is set for a lesser depth, the lifting wheel will be rendered inoperative until the inclination of the blade is altered so as to correspond with the setting of the lifting wheel. That is to say, that when the lifting wheel is tripped to lower the frame, it is impossible for the frame to descend sufficiently to bring the clutch into disengaging position and neither can the wheel W lift itself off of the ground, so consequently, the clutch being engaged, it necessarily follows that the wheel W will skid until the blade is set at the proper inclination to penetrate to the depth at which the wheels have been set. Also, this provides an accurate indicator for the required inclination of the blade in any instance. That is to say, the blade is first set at less than the required inclination and then the inclination is gradually increased until the lifting wheel completes its operation and disengages the clutch, which is assurance that the blade and wheels are set to operate at corresponding depths. Then the implement can be repeatedly operated at this same depth and the lifting wheel employed to lift the blade clear of the ground, for travel from one patch of tares to another, where tripping the lever 43 will again lower the blade to the previous depth. These statements are intended to be restricted to deep tillage in hard ground; and, inclination of the blade is intended to mean its inclination with respect to its supporting standards, irrespective of the fact that increasing this inclination results in the blade penetrating deeper until it is again parallel with its path of travel as before.

When the wheels are set to raise the blade from deep tillage to shallow tillage, the pitch of the blade relative to its path of travel is thereby increased because of the fact that the draw-bar attachment to the tractor is at a fixed height and does not raise with the rear of the frame. Even this increased pitch of the blade is usually not sufficient for shallow tillage and consequently it is necessary to further increase the inclination of the blade with respect to its supporting standards for otherwise it will rise to the surface even though it did penetrate to a greater depth with less inclination and practically no pitch relative to its path of travel. For this shallow tillage there is also a cooperative relationship between the lifting wheel and the inclination of the blade even though it is quite different from the relationship for deep tillage. The lifting wheel will again be inoperative until the blade is set at the proper inclination to maintain itself in the soil at this shallow depth and actuate the lifting wheel to its disengaging position.

When it is desired to continuously operate the implement for deep tillage over large acreage, it is conveniently practical to set the blade at the proper inclination to penetrate to the desired depth, and after the lifting wheel has functioned to the operative position, to then operate the lever 46 to raise the wheels clear of the ground, whereupon the blade will remain parallel with its path of travel and maintain a constant depth although the wheels are inactive. In this situation, tripping of the lift wheel will cause it to first fall to the ground and then traction will actuate it for lifting the implement to the transport position. This requires resetting the wheels for the next period of operation, but is of advantage where there are several hours of continuous operation without lifting the blade out of the ground. Furthermore, with the wheels free of the ground the depth of tillage can be varied solely by altering the inclination of the blade, even to the extent of causing the blade to rise from a depth of 14 inches to entirely upon the surface of the ground. In some instances the blade is operated generally over the field at a depth of eight inches until a patch of large tares are encountered and then the inclination of the blade is properly altered, so as to cut such tares at a depth of 14 inches, and the blade is again returned to the inclination required for the 8 inch depth, the showing in Fig. 2 being particularly serviceable for this variable utilization.

For patch to patch operation, the previously described blade and lifting wheel coordination is more desirable.

In some instances this lifting wheel may be supplanted by any manually operated lift, or for deep tillage the wheels may be entirely omitted and the implement operated solely by blade actuation; however, wheels are necessary as a depth gauge for shallow tillage. In any utilization where the blade will operate parallel to its path of travel the wheels may be omitted, but wheels are necessary as a depth gauge in any instance where the blade must be set at a certain pitch relative to its path of travel. As before mentioned, the inclination of the blade must be varied according to the nature of the soil, the depth of operation, and the underground character of the vegetation. In any instance, the blade is set at the least inclination which will afford satisfactory operation, as that precaution greatly conserves the amount of fuel required for tractor power. The functioning of the implement serves as an adequate guide to enable the operator to properly regulate the operation as circumstances suggest and necessity requires.

The implement cuts a smooth even floor at whatever depth it is operated, and normally forms a temporary void at the rear of the blade 14. This temporary void is utilized for the purpose of flowing liquid chemicals upon this smooth even floor where they will flow evenly to form a uniform deposit of chemicals at a spaced distance below the surface of the soil. The invention is not concerned with the identity of the chemicals and they may be any of the well known chemicals, as for instance, an aqueous solution of sodium chlorate, which is commonly used for exterminating weeds. Any of the water soluble chemical fertilizers, such as the various nitrates, may be deposited on this smooth floor cut at the proper depth for efficient fertilization, instead of for weed extermination.

Fig. 5 shows the previously described implement provided with a tank 50 mounted upon suitable supports such as 51 and provided with a spring urged valve 52 opening into a pipe 53 which feeds a cross pipe 54 to which are connected flexible conduits such as 55 spaced apart corresponding to the spacing of the standards 10, 11 and 12; and these conduits all connect to a multi-perforate pipe 56 which extends full length of the blade 14 and is securely fixed thereto, preferably by welding. The ends of the pipe 56 are closed and a series of perforations P are spaced apart along the length of the pipe so that liquid from the tank 50 can be distributed throughout the length of the blade 14.

The flexible conduits 55 are made of the proper length to accommodate the required hinge movement of the blade 14. Suitable keepers hold these conduits in alignment with the rear edge of the respective standards and for this purpose it is preferable to employ a shield such as 57 which is U-shape in cross section and saddled over the standard and secured thereto, preferably by welding. Each shield is of sufficient length to protect the underground portion of the conduit and is wide at the bottom and gradually tapers towards the top so as to adequately provide for the required movement of the flexible conduit 55 which is slidably mounted therein, so that when the inclination of the blade is increased, the conduit will be free to bow in the manner illustrated and thus accommodate the slack.

It will be noted that the lower end of each flexible conduit 55 is protected by reason of its position between paired arms 16 to which it can also be secured if desired for sturdiness. There is ample room between these arms 16 to provide for a separable connection between each conduit and the perforate pipe 56 if desired, and these common mechanical expedients are not here illustrated.

When used for depositing chemicals under the surface of the soil, the implement is operated in the previously described manner, and additionally, the valve 52 is opened whenever it is desired to deposit the chemical at a particular location, as for instance, when a patch of tares is encountered. The valve can be conveniently operated from the tractor driver's seat by means of a pull rope as indicated by the dot and dash line Y. If desired, the liquid may be put under pressure in any suitable manner, however, gravity alone will usually suffice, as it is desirable to use the smallest practical amount of liquid so as to avoid the inconvenience of frequently filling the tank. Where aqueous solutions are used it is a simple matter to increase the amount of chemical in the water instead of depositing an increased amount of liquid.

It will be seen that my improved tillage implement can be employed for applying chemicals below the surface of the soil, and that the chemicals will be uniformly distributed over the smooth floor at whatever depth the implement is operated. This assures that the chemicals will be sufficiently below the surface of the soil to prevent them from being inadvertently carried away by rain fall; and furthermore, any suitable weed destroying chemical can be applied at sufficient depth to avoid interference with the roots of subsequently planted crops, but at a depth where the chemical will affect the roots of large tares.

The tillage implement of my invention provides efficient deep tillage and coarsely breaks up the soil and leaves it unturned in its original position upon a smooth even floor located at sufficient depth to afford adequate water storage capacity and materially reduce the amount of "runoff" otherwise inevitable when there is abundant rainfall on cultivated hillsides and which is a grave factor in soil erosion. Controlling the inclination of the blade accordng to my invention, makes it possible to efficiently operate the implement at whatever depth is best suited for the particular soil condition, which varies quite widely according to geographical location, geological formation, previous erosion, and other factors. This wide range of utility would be impossible in the absence of controlled inclination of the blade as afforded by my invention.

My invention can be periodically operated over the same patch of tares, progressively increasing the depth at each period so as to hamper the tares at various depths and gradually exterminate them.

In the present disclosure I claim as my invention:

1. A tillage implement comprising a frame, earth engaging standards rigid with said frame, a cutting blade hinged underneath the lower ends of said standards, a rock shaft journaled on the rear of said frame, arms on said rock shaft and aligned with said standards, links extending downwardly behind said standards and operatively connecting said arms with said blade, means to operate said rock shaft and thereby impart a hinge movement to said cutting blade, and means to hold said rock shaft at set positions of rotation to maintain said blade at set inclination relative to said standards.

2. A tillage implement comprising a frame, earth engaging standards fixed to said frame, a cutting blade hinged to said standards, a rock shaft journaled on the rear of said frame, arms on said rock shaft and aligned with said standards, links extending downwardly behind said standards and operatively connecting said arms with said blade, a lever arm on said rock shaft, a bearing swingingly mounted on said lever arm, a second bearing swingingly mounted in a support fixed to said frame, a rod mounted in said bearings and held against end movement in one of them and having threaded engagement with the other of them, whereby turning of said rod will actuate said rock shaft and impart a hinge movement to said cutting blade.

3. A tillage implement comprising a frame, earth engaging standards rigid with said frame, a cutting blade hinged underneath the lower ends of said standards, a rock shaft journaled on the rear of said frame, arms on said rock shaft and aligned with said standards, links extending downwardly behind said standards and operatively connecting said arms with said blade, a latch lever on said rock shaft, and a toothed sector cooperating with said lever to hold said blade at a set inclination relative to said standards.

4. A tillage implement comprising a frame, earth engaging standards fixed to said frame, a cutting blade hinged to said standards, a rock shaft journaled on the rear of said frame, arms on said rock shaft and aligned with sand standards, links extending downwardly behind said standards and operatively connecting said arms with said blade, means to operate said rock shaft and thereby impart a hinge movement to said cutting blade, a crank axle journaled on said frame, a wheel journaled upon one end of said crank axle, a traction lifting wheel journaled upon the other end of said crank axle, means including a clutch for connecting said lifting wheel with said frame to lift the latter, and lever means to alter the range of lifting movement.

5. A tillage implement comprising a frame, earth engaging standards fixed to said frame, a cutting blade hinged to said standards, means to alter the inclination of said cutting blade and hold the same at set inclination relative to said standards, a crank axle journaled on said frame, a wheel journaled upon one end of said crank axle, a traction lifting wheel journaled upon the other end of said crank axle, means including a clutch for connecting said lifting wheel with said frame to lift the latter, and lever means to alter the range of lifting movement.

6. A tillage implement comprising a frame, earth engaging standards fixed to said frame, a cutting blade hinged to said standards, a pair of wheels supporting said frame, and means for raising and lowering said frame relative to said wheels, a rock shaft journaled on the rear of said frame, arms on said rock shaft and aligned with said standards, links extending downwardly behind said standards and operatively connecting said arms with said blade, means to hold said rock shaft at set positions of rotation to impart to said cutting blade an inclination operatively corresponding to the relative positions of said wheels and frame.

7. A tillage implement comprising a frame, earth engaging standards fixed to said frame, a straight cutting blade hinged to the lower ends of said earth engaging standards, a rock shaft journaled on the rear of said frame, arms on said rock shaft and aligned with said standards, links extending downwardly behind said standards and operatively connecting said arms with said blade, a crank axle journaled on said frame, a wheel journaled on one end of said crank axle, a traction lifting wheel journaled upon the other end of said crank axle, means including a clutch cooperating with said lifting wheel to lift said frame by a half rotation of said clutch, means to alter the range of lifting movement, a spring urged trip lever normally holding said clutch disengaged and in fixed position at each half rotation thereof which results from manual operation of said trip lever to effect engagement of said clutch when raising and lowering said frame, means to turn said rock shaft to the position required to impart to said cutting blade an inclination which will enable the latter to penetrate the soil to sufficient depth to complete a one half revolution of said clutch so that said spring urged trip lever will disengage said clutch and hold the same in fixed position while said lifting wheel turns free.

8. A tillage implement comprising a frame, earth engaging standards fixed to said frame, a straight cutting blade hinged to the lower ends of said earth engaging standards, a crank axle journaled on said frame, a wheel journaled on one end of said crank axle, a traction lifting wheel journaled upon the other end of said crank axle, means including a clutch cooperating with said traction lifting wheel to lift said frame by a half rotation of said clutch, means to alter the range of lifting movement, a spring urged trip lever normally holding said clutch disengaged and in fixed position at each half rotation thereof which results from manual operation of said trip lever to effect engagement of said clutch when raising and lowering said frame, means to gradually set said cutting blade at the hinged inclination which will enable it to penetrate the soil to sufficient depth to complete a one half revolution of said clutch so that said spring urged trip lever will disengage said clutch and hold the same in fixed position while said lifting wheel turns free.

9. A tillage implement comprising a frame, a tank carried by said frame, earth engaging standards fixed to said frame, a cutting blade hinged to said standards, a multi-perforated pipe carried by said blade, flexible conduits spaced apart complementary to said standards and connecting said pipe to derive flow from said tank, individual shields for each of said conduits, each of said shields saddled over the rear of the respective standards and secured thereto, said conduits slidably mounted in the respective shields, manually operated means to gradually alter the inclination of the hinged blade relative to said standards, and a shut-off valve for the flow from said tank.

10. A tillage implement comprising a frame, a tank carried by said frame, earth engaging standards fixed to said frame, a cutting blade hinged to said standards, a multi-perforated pipe carried by said blade, flexible conduits spaced apart complementary to said standards and connecting said pipe to derive flow from said tank, individual shields for each of said conduits, each of said shields saddled over the rear of the respective standard and secured thereto, said conduits slidably mounted in the respective shields, a shut-off valve for the flow from said tank, a rock shaft journaled on said frame, arms on said rock shaft, links connecting said arms with said blade, means to operate said rock shaft and thereby impart a hinge movement to said blade.

11. A tillage implement comprising a frame, earth engaging standards fixed to said frame, a cutting blade hinged to said standards, means to alter the inclination of the blade relative to said standards, a multi-perforated pipe carried by said blade, a tank mounted on said frame, flexible conduits slidably mounted on said standards and connecting said pipe to derive flow from said tank, and a shut-off valve of the flow from said tank.

TIMOTHY RUBENS.